(No Model.)
A. REESE.
CAR BRAKE.
No. 321,757 — Patented July 7, 1885.
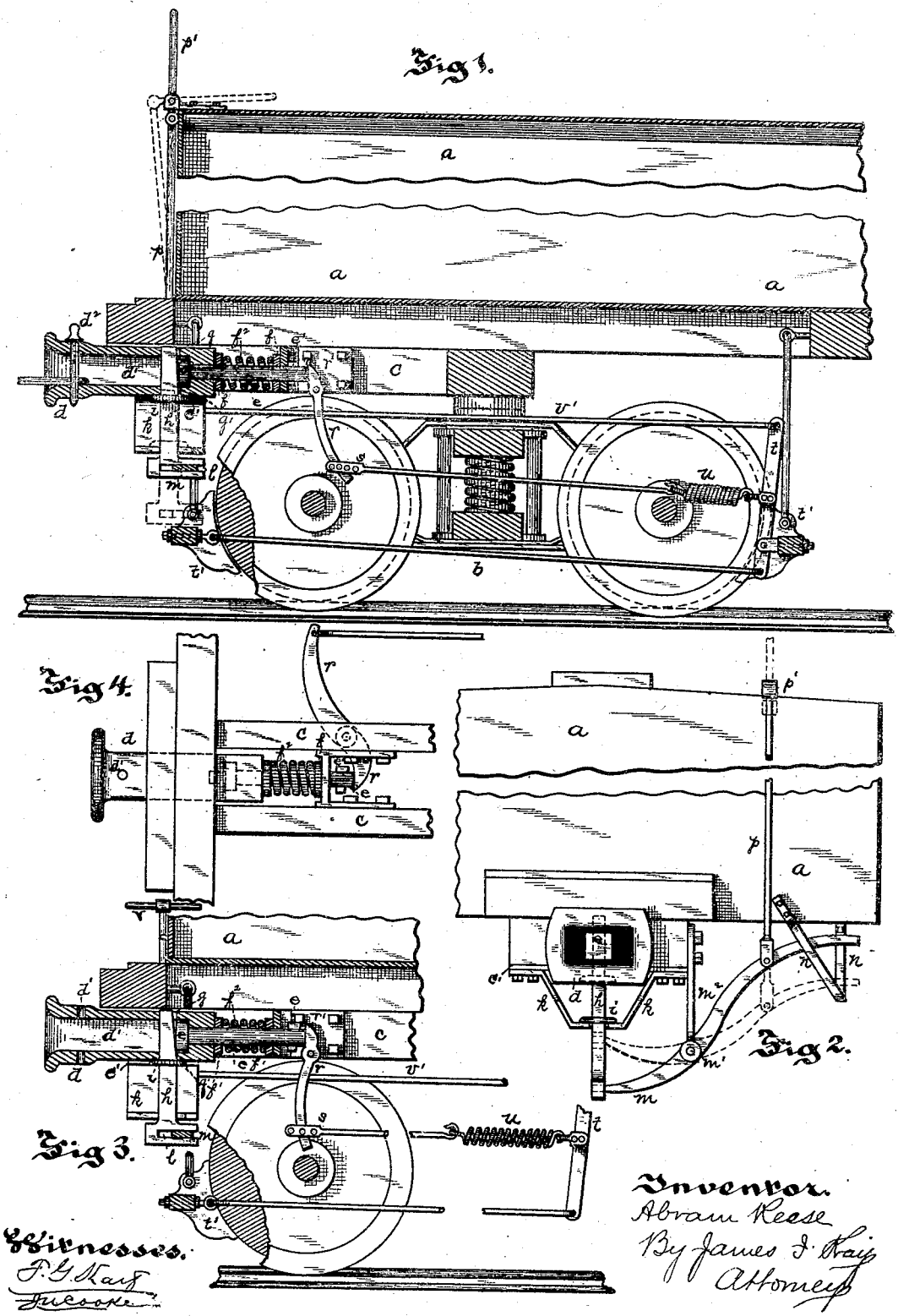
Witnesses.
Inventor.
Abram Reese
By James I. Kay
Attorney

UNITED STATES PATENT OFFICE.

ABRAM REESE, OF PITTSBURG, PENNSYLVANIA, ASSIGNOR TO HARRY W. REESE, OF SAME PLACE, AND ROBERT C. TOTTEN, OF ALLEGHENY CITY, PENNSYLVANIA.

CAR-BRAKE.

SPECIFICATION forming part of Letters Patent No. 321,757, dated July 7, 1885.

Application filed April 22, 1885. (No model.)

*To all whom it may concern:*

Be it known that I, ABRAM REESE, of Pittsburg, in the county of Allegheny and State of Pennsylvania, have invented a new and useful Improvement in Car-Brakes; and I do hereby declare the following to be a full, clear, and exact description thereof.

My invention relates to car-brakes, and has relation to that class of brakes known as "draw-head brakes," in which the brakes are applied by the movement of the draw-heads when the cars approach each other and the draw-heads are pressed back into the car in what is known as "buffing." In these brakes as heretofore constructed the brakes have been applied either directly from lever mechanism operated by the draw-head in its backward movement and connected with the brake-lever, or by mechanism which is operated by the backward movement of the draw-head to connect clutch or friction apparatus and wind-up chain or like device, and so apply the brakes. My invention is included in the first one of these divisions, and in this division of draw-head brakes there are two subdivisions, in one of which the lever mechanism is caused to engage with the draw-head by means of centrifugal apparatus upon the car-axle, this form of brake only operating when the train has attained a certain speed, while in the other subdivision the lever mechanism is caused to engage with the draw-head by lever or chain apparatus, so that it may be connected or disconnected therewith at pleasure, my invention being included in the second of these subdivisions.

The car-couplings generally employed on railroad-cars are composed of a draw-head supported in suitable brackets, and a draw-bar having a large head at one end thereof, which extends through the rear end of the draw-head and passes through buffer-plates, and a spring confined between these plates, and is held in position by a pin or nut passing through or screwed onto the end of the draw-bar, the buffer-plates being supported within a suitable frame; and upon drawing strains on the draw-head the bolt is drawn forward by the draw-head and draws with it the rear buffer-plate, thus compressing the spring, while when the draw-heads come together in backing or stopping the rear end of the draw-head presses against the forward buffer-plate and so compresses the buffer-spring, the bolt-head generally remaining stationary and extending into a cavity within the draw-head. In my invention I operate the brakes through the backward movement of this draw-bar, causing it to travel backward with the draw-head in its buffing movement, and this I acccomplish by combining with the draw-head and draw-bar a movable bar or plate extending through the draw-head in front of the draw-bar in such position as to cause the draw-bar to move back with the draw-head on the buffing pressure, and suitable lever mechanism connected to the brake-lever of the brake apparatus, and adapted to be pushed back by the bar, so that when this plate extends into the draw-head in front of the draw-bar upon the braking of the locomotive or forward car of the train, the draw-bar will be carried back with the draw-head and operate this lever mechanism to apply the brakes, the usual car-coupling being thus adapted to apply the brakes by the addition of this movable plate and a lever-connection with the brake apparatus, and means for operating the movable plate.

My invention also consists in certain details of construction, as hereinafter specifically set forth.

To enable others skilled in the art to make and use my invention, I will describe the same more fully, referring to the accompanying drawings, in which—

Figure 1 is a longitudinal section of a portion of a railroad-car, illustrating the same, some parts being shown in full lines. Fig. 2 is a front or face view of the same, the trucks being removed; and Figs. 3 and 4 are detail views of my improved apparatus.

Like letters of reference indicate like parts in each.

The car *a* is of the usual or any desired construction, that illustrated being the ordinary box freight-car, and this freight-car having the truck *b* and draft-timbers *c* and the coupling apparatus supported in the usual way at the forward end of said draft-timbers. The coupling apparatus illustrated is formed of the draw-head $d$, the draw-bar $e$, the buffer-plates $f f'$, and the spring $f^2$, the draw-head having the cavity $d'$, through which, in the construction shown, the ordinary coupling-pin, $d^2$, extends. Extending through the rear end of the draw-head is the ordinary hole through which the draw-bar $e$ passes, the draw-bar being inserted from the forward end of the draw-head through this hole, through the buffer-plates and buffer-spring, and being secured back of the rear buffer-plate, $f$, by means of the pin $e'$. When a drawing or longitudinal strain is brought upon the draw-head through the draw-bar $e$, it draws upon the buffer-plate $f$, and so compresses the buffer-spring $f^2$; but when the draw-head is pushed back and the cars come together, as in backing or checking the train, the end of the draw-head presses against the buffer-plate $f'$, compressing the spring, the end of the draw-bar generally extending into the cavity $d'$ of the draw-head.

To this or any similar construction of coupling my invention is applied as follows: Extending through the walls of the draw-head, in front of the draw-bar, are formed suitable guide-holes, $g g'$, through which the movable bar or plate $h$ extends, this bar or plate preferably having an inclined face, as shown, to cause it to enter more easily, against which plate $h$ the head of the draw-bar presses, so that when this plate $h$ extends into or through the draw-head it prevents the movement of the draw-bar into the cavity of the draw-head when the draw-head is pushed back, and so causes the draw-bar to travel back with the draw-head upon any buffing movement of the draw-head. The plate $h$ is preferably secured in place in substantially the manner shown in Fig. 2, the plate extending up from below between the edges of the guide-bracket $k$, which is formed of plates bent to substantially the shape shown in Fig. 2, the plates being bolted to the draft-timbers by means of the bolts securing the bracket or cross-plate $c'$, usually employed to support the draw-head between the draft-timbers. The lower edges of these plates extend close to the sides of the plate $h$, and so form a long guide-slot open at the front, within which the plate $h$ moves upon the longitudinal movement of the draw-head between the draft-timbers, though it in no way impedes the longitudinal movement of the plate $h$ with the draw-head. On the plate $h$, above the bracket $k$, are formed the shoulder or shoulders $i$, by means of which the plate is supported on the bracket when the plate is withdrawn from in front of the draw-bar, as shown in dotted lines in Fig. 1, and in full lines in Fig. 2.

Extending into the base-plate $h$ from the rear thereof is the horizontal slot $l$, within which fits the end of the lever $m$, this lever being pivoted at $m'$ to a suitable hanging bracket, $m^2$, secured to one draft-timber, and the opposite end of the lever extending up into a suitable guide-bracket, $n$, secured to the body of the car. When the invention is employed with the ordinary platform-car, this lever $m$ may be operated by means of the end extending up into this bracket $n$; but when the invention is employed in connection with the ordinary box-car, as shown, I usually employ the rod $p$, connected to the lever $m$ and to the lever $p'$, pivoted in a suitable bracket at the top of the car, this lever resting on the top of the car when the plate $h$ is withdrawn from in front of the draw-bar and the brake apparatus is off, but extending up above the car, as shown in Fig. 1, when the movable plate $h$ is raised in front of the draw-bar, and the apparatus is in position to operate the brakes.

Mounted in any suitable bracket, $r'$, on the draft-timbers back of the rear draft-plate, $h$, is the lever $r$, the upper end of which extends up back of the rear end of the draw-bar, while its lower end is connected by means of a suitable link or rod, $s$, with any suitable part of the brake apparatus, in the drawings shown the lever being connected directly with one of the vertical levers $t$ of the brake apparatus on the truck $b$, and the power being applied from this brake-lever $t$ to the brake-shoes $t'$ by any suitable rod-connections.

As the force obtained from the apparatus is exceedingly powerful, and a very heavy strain is sometimes brought upon it, which is in some cases sufficient to shear off the pivotal bolt of the lever $r$, I employ the spring $u$ between the end of the lever $r$ and the brake apparatus, this spring being generally located between the rod or link $s$ and the vertical lever $t$, this spring being of sufficient stiffness and strength to apply all the requisite force to the brakes, but adapted to yield before it will entirely check the movement of the wheels, and so preventing the sliding of the wheels on the rails and the formation of flat faces on the wearing-periphery of the wheels.

The lever $r$, by means of which the power is transmitted from the draw-head to the regular brake apparatus, is preferably located as shown in Figs. 1, 2, and 3; but in some cases it may be preferable to locate it substantially in the manner shown in Fig. 4, in which the said lever is horizontal and the power is applied from this horizontal lever by a rod or chain to the lever of the ordinary brake apparatus.

The car is preferably provided with the ordinary hand brake-wheel, $v$, connected by suitable rods or chain, $v'$, to the brake apparatus of the car, so that the brakes may be applied by hand, my improved apparatus in no way interfering therewith.

When my improved brake is in use where the cars are running in the ordinary way—the train being drawn by the locomotive—the movable plates $h$ are raised through the draw-head in front of the draw-bar by means of the lever $m'$, the lever $p'$ being raised by the brakeman, and so pushing down the rod $p$ and depressing the outer end of the lever $m$, which, through its opposite end, raises the movable plate within the draw-head, this plate passing up through the cavity of the draw-head and its upper end fitting within the upper seat, $g'$, in the top wall of the draw-head, the plate thus extending in front of the head of the draw-bar, and so preventing the draw-bar from passing forward into the cavity $d'$ of the draw-head. So long as the train is drawn by the locomotive the coupling apparatus operates in the ordinary manner; but as soon as the speed of the locomotive or the forward car is checked and the draw-heads of the cars are pressed inwardly, the plates $h$, extending in front of the draw-bars, cause the draw-bars to be carried back with the draw-heads, and the opposite ends of the draw-bars press against the upper ends of the levers $r$, which extend in front of them, thus causing the levers $r$, through the rod $s$, to draw upon the brake apparatus and apply the brakes. A very slight movement of the draw-heads and draw-bars is sufficient to apply the brakes; but where there is very heavy pressure upon the faces of the draw-bars they are often pressed back with such force as to break the brake apparatus, and when this force is brought upon the brake apparatus the spring $u$ is drawn out, so that the force brought upon the brakes is merely sufficient to check them without applying sufficient force to hold the wheels from revolving while the train is in motion, and consequently there is no liability of wearing the flat faces on the wheels, as above referred to, and all liability of the rupture of any parts of the apparatus is overcome.

The brake apparatus operates automatically to apply the brakes, so that they require no attention; and the engineer can, by controlling the speed of the engine, cause the application of all the brakes in the train with whatever pressure he desires, so that by means of my simple apparatus the train is entirely under his control. In case it is desired to back the train the movable plates $h$ are withdrawn from in front of the draw-bars, when the train can be backed in the ordinary manner, the automatic brake apparatus not operating. In case the train should break in different parts, each part can be controlled by my improved brake apparatus, so as to prevent collision or other accident, and stop each part or control its movement in descending grades by applying the hand-brake to the forward car in the direction in which it is moving, thus causing the compression of the draw-heads in the other cars and application of the automatic brakes.

The operation of the brake being independent on each car, its utility is not impaired when the car is connected in the same train with other cars having different power-brake apparatus or none at all. In case of sufficient strain coming upon the draw-head of any car to break the draw-bar pin $e'$, which sometimes occurs, there is no liability of the breaking of the connections applied to the draw-head, as the movable plate will be drawn forward by the draw-head until it is drawn out of the bracket $k$, when it will drop to the ground; and as the slot $l$ at the base of the plate $h$ is opened at the rear thereof, the plate will simply be drawn off the lever $m$, and will be uninjured, and when the draw-head is again replaced the parts can be connected without even the use of a bolt.

What I claim as my invention, and desire to secure by Letters Patent, is—

1. In car-brake apparatus, the combination of a draw-head, a draw-bar, a movable plate extending into the draw-head in front of the draw-bar, and suitable connection between the draw-bar and car-brakes.

2. In car-brake apparatus, the combination of a draw-head, a draw-bar, a movable plate extending into the draw-head in front of the draw-bar, and lever mechanism for moving said plate.

3. In car-brake apparatus, the combination of the draw-head, the draw-bar, the movable plate $h$, extending into the draw-head in front of the draw-bar, and having a shoulder, $i$, and the bracket $k$, having a guide-slot therein, substantially as and for the purposes set forth.

4. In car-brake apparatus, the combination of the draw-head, the draw-bar, the movable plate $h$, extending into the draw-head in front of the draw-bar, and having the slot $l$, open at the back, and the lever $m$, fitting in said slot, substantially as and for the purposes set forth.

5. In car-brake apparatus, the combination of the draw-head, the draw-bar, the movable plate $h$, extending into the draw-head in front of the draw-bar, and having the shoulder $i$ and slot $l$, open at the back, the bracket $k$, having the guide-slot open at the front, and the lever $m$, fitting in the slot $l$, substantially as and for the purposes set forth.

In testimony whereof I, the said ABRAM REESE, have hereunto set my hand.

ABRAM REESE.

Witnesses:
F. G. KAY,
J. N. COOKE.